(12) United States Patent
Xie et al.

(10) Patent No.: US 12,706,815 B2
(45) Date of Patent: Aug. 11, 2026

(54) METHOD OF CONTAINER CLUSTER MANAGEMENT AND SYSTEM THEREOF

(71) Applicant: ZTE CORPORATION, Shenzhen (CN)

(72) Inventors: Baoguo Xie, Shenzhen (CN); Wei Yan, Shenzhen (CN); Manchang Ju, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 1 day.

(21) Appl. No.: 18/112,539

(22) Filed: Feb. 22, 2023

(65) Prior Publication Data

US 2023/0261950 A1 Aug. 17, 2023

Related U.S. Application Data

(63) Continuation of application No. PCT/CN2020/116219, filed on Sep. 18, 2020.

(51) Int. Cl.

| | |
|---|---|
| ***H04L 41/40*** | (2022.01) |
| ***G06F 9/455*** | (2018.01) |
| ***H04L 41/0806*** | (2022.01) |
| ***H04L 41/084*** | (2022.01) |
| ***H04L 41/342*** | (2022.01) |

(52) U.S. Cl.

CPC .......... *H04L 41/40* (2022.05); *G06F 9/45558* (2013.01); *H04L 41/0806* (2013.01); *H04L 41/084* (2013.01); *H04L 41/342* (2022.05); *G06F 2009/4557* (2013.01); *G06F 2009/45595* (2013.01)

(58) Field of Classification Search

CPC ... H04L 41/40; H04L 41/0806; H04L 41/084; H04L 41/342; H04L 41/0895; H04L 41/0843; H04L 41/0893; G06F 9/45558; G06F 2009/4557; G06F 2009/45595; G06F 2009/45575

See application file for complete search history.

(56) References Cited

U.S. PATENT DOCUMENTS 10,841,152 B1 * 11/2020 Humphreys ............ H04L 67/10
11,194,609 B1 * 12/2021 Melkild ............. H04L 63/0428

(Continued)

FOREIGN PATENT DOCUMENTS

CN 107689882 A 2/2018
CN 109032758 A 12/2018

(Continued)

OTHER PUBLICATIONS

Database English translation of WO-2020011214-A1, 36 pages, (Year: 2020).*

(Continued)

*Primary Examiner* — Patrice L Winder

(74) *Attorney, Agent, or Firm* — Foley & Lardner LLP

(57) ABSTRACT

A method for use in a container cluster management element is disclosed. The method comprises generating a container cluster instance based on a container cluster descriptor, CCD, template, wherein the container cluster instance comprises at least one master node and at least one work node, and transmitting, to a management element, the container cluster instance for use in a life cycle management operation of at least one virtual network function.

10 Claims, 7 Drawing Sheets

(56) References Cited

U.S. PATENT DOCUMENTS

| | | | | |
|---|---|---|---|---|
| 11,301,276 | B2 * | 4/2022 | Mellquist | G06F 9/45541 |
| 11,354,167 | B2 * | 6/2022 | Xia | G06F 9/45558 |
| 2018/0159819 | A1 | 6/2018 | Wei et al. | |
| 2020/0274800 | A1 | 8/2020 | Stevens et al. | |
| 2020/0412596 | A1 * | 12/2020 | Cherunni | H04L 41/5054 |
| 2021/0224093 | A1 * | 7/2021 | Fu | G06F 9/45558 |
| 2021/0311764 | A1 * | 10/2021 | Rosoff | G06F 9/45558 |
| 2021/0326167 | A1 * | 10/2021 | Yang | H04L 41/5054 |
| 2021/0397470 | A1 * | 12/2021 | Zhang | G06F 9/45558 |
| 2022/0035650 | A1 * | 2/2022 | Banerjee | G06F 9/45558 |
| 2022/0217045 | A1 * | 7/2022 | Blau | H04L 41/0843 |
| 2023/0072358 | A1 * | 3/2023 | Baillargeon | G06F 9/5088 |
| 2023/0153162 | A1 * | 5/2023 | Baillargeon | G06F 9/45558 718/104 |
| 2023/0195497 | A1 * | 6/2023 | Ota | G06F 9/455 718/1 |

FOREIGN PATENT DOCUMENTS

| | | | | |
|---|---|---|---|---|
| CN | 109814881 A | | 5/2019 | |
| CN | 110971439 A | | 4/2020 | |
| CN | 111176788 A | | 5/2020 | |
| CN | 111614490 A | | 9/2020 | |
| KR | 20180058458 A | | 6/2018 | |
| WO | WO-2020011214 A1 | * | 1/2020 | G06F 9/45558 |
| WO | WO-2020/177564 A1 | | 9/2020 | |

OTHER PUBLICATIONS

J. Watada, A. Roy, R. Kadikar, H. Pham and B. Xu, "Emerging Trends, Techniques and Open Issues of Containerization: A Review," in IEEE Access, vol. 7, pp. 152443-152472, 2019, doi: 10.1109/ACCESS.2019.2945930. (Year: 2020).*

L. T. Bolivar, C. Tselios, D. Mellado Area and G. Tsolis, "On the Deployment of an Open-Source, 5G-Aware Evaluation Testbed," 2018 6th IEEE International Conference on Mobile Cloud Computing, Services, and Engineering (MobileCloud), Bamberg, Germany, 2018, pp. 51-58. (Year: 2018).*

H. Yang, C.-P. Hoang and Y. Kim, "Architecture for Virtual Network Function's High Availability in Hybrid Cloud Infrastructure," 2018 IEEE Conference on Network Function Virtualization and Software Defined Networks (NFV-SDN), Verona, Italy, 2018, pp. 1-5, doi: 10.1109/NFV-SDN.2018.8725784. (Year: 2018).*

M. Kim et al., "TOSCA-based clustering service for network function virtualization," 2016 International Conference on Information and Communication Technology Convergence (ICTC), Jeju, Korea (South), 2016, pp. 1176-1178, doi: 10.1109/ICTC.2016.7763398 (Year: 2016).*

H. Yang et al., "Architecture for Virtual Network Function's High Availability in Hybrid Cloud Infrastructure," 2018 IEEE Conference on Network Function Virtualization and Software Defined Networks (NFV-SDN), Verona, Italy, 2018, pp. 1-5, doi: 10.1109/NFV-SDN.2018.8725784. (Year: 2018).*

Yang et al., Architecture for Virtual Network Function's High Availability in Hybrid Cloud Infrastructure,2018 IEEE Conference on Network Function Virtualization and Software Defined Networks (NFV-SDN): O4SDI-4th Orchestration for Software-Defined Infrastructures @ 2018 IEEE NFV-SDN, 5 pages. (Year: 2018).*

Cong-Phoc Hoang et al., An Extended Virtual Network Functions Manager Architecture to Support Container, ICISS '18, Apr. 27-29, 2018 Association for Computing Machinery, p. 173-176. (Year: 2018).*

MeriePaule Odini, HOE, "OpenSource MANO", IEEE Software Defined Networks, July 2106, 14 pages. (Year: 2016).*

International Search Report and Written Opinion for PCT Appl. No. PCT/CN2020/116219 mailed Jun. 18, 2021. (7 pages).

Extended European Search Report for EP Appl. No. 20953703.4, dated Feb. 23, 2024 (8 pages).

Cong-Phuoc Hoang et al., "An Extended Virtual Network Functions Manager Architecture to Support Container," 2018 (4 pages).

Examination Report on India Appl. No. 202327009348 dated Jul. 28, 2025 (10 pages).

Office Action for KR Appl. No. 10-2023-7004947 dated Jul. 18, 2025 (6 pages).

Notice of Submission of Opinion on KR Appl. No. 10-2023-7004947 dated Apr. 29, 2026 (10 pages).

Communication pursuant to Article 94(3) EPC on EP Appl. No. 20953703.4 dated Feb. 9, 2026 (5 pages).

First Office Action on CN Appl. No. 202080103796.7 dated May 29, 2026 (40 pages).

* cited by examiner

Third party
OSS
NFVO
Container Cluster instance
Work node
Master node
EMS
VFIM
CCM
CISM
Container Cluster instance
Work node
Master node
VIM
MANO Receive, from a CCM element, a container cluster instance for use in a life cycle management operation of at least one virtual network function

1000

Transmit, to a CCM element, a cluster generation request of generating a container cluster instance based on a CCD template

1200

METHOD OF CONTAINER CLUSTER MANAGEMENT AND SYSTEM THEREOF

This application is a continuation of PCT/CN2020/116219, filed Sep. 18, 2020, the content of which is incorporated herein by reference in its entirety.

TECHNICAL FIELD

This document is directed generally to container cluster management, and more particularly to container cluster management in a network function virtualization (NFV) system.

BACKGROUND

In the existing NFV specifications, an NFV management and orchestration (NFV-MANO) is a framework for the management and orchestration of virtualized network functions (VNF). NFV-MANO is responsible for the lifecycle management of network service (NS) and for the virtual network function/virtual network function component (VNF/VNFC). During a VNF lifecycle management procedure (e.g. VNF instantiation procedure), a VNF manager (VNFM) manages VNF resources and requests resource authorization for VNF instantiation operations to an NFV orchestrator (NFVO) in accordance with resource information in an VNF descriptor (VNFD) template. After the NFVO resource authorization is passed, the VNFM requests a virtual infrastructure manager (VIM) to allocate corresponding virtual machine (VM) resources for the VNF instance. The VIM interacts with an infrastructure platform (i.e. a network function virtualization infrastructure (NFVI)) to allocate resources for the NVF instance, and finally NFV-MANO completes the VNF instantiation and success to create a VM based VNF instance.

SUMMARY

The present disclosure relates to a method and a system for container cluster lifecycle management and resource orchestration in an NFV system. In the NFV system, when a containerized VNF performs lifecycle management operations, the NFV-MANO uses cluster resources as container resources to complete the VNF lifecycle management operations (e.g. VNF instance operation).

The present disclosure relates to a method for use in a container cluster management element. The method comprises generating a container cluster instance based on a container cluster descriptor, CCD, template, wherein the container cluster instance comprises at least one master node and at least one work node, and transmitting, to a management element, the container cluster instance for use in a life cycle management operation of at least one virtual network function.

Various embodiments may preferably implement the following features:

Preferably, or in some implementations, the method further comprises receiving a cluster generation request of generating the container cluster instance from at least one of the management element, an operation support system, OSS, or a third party.

Preferably, or in some implementations, the cluster generation request comprises an identification of the CCD template.

Preferably, or in some implementations, the method further comprises receiving a request for a management of the container cluster instance.

Preferably, or in some implementations, the request for the management of the container cluster instance is received from the management element.

Preferably, or in some implementations, the method further comprises transmitting, to the OSS, a request for generating the container cluster instance, and receiving, from the OSS, an agreement response comprising the CCD template or an identification of the CCD template.

Preferably, or in some implementations, the container cluster instance is generated by:

requesting for allocating at least one of computing resources, storage resource or network resources for the at least one master node and at least one work node based on the CCD template, deploying, based on the CCD template, the at least one master node as at least one container infrastructure service manager, and deploying, based on the CCD template, the at least one work node as at least one container infrastructure service instance.

Preferably, or in some implementations, the method further comprises receiving a request of CCD template onboarding from at least one of the management element, an operation support system, OSS, or a third party, and receiving the CCD template from at least one of the management element, the OSS or the third party.

Preferably, or in some implementations, the method further comprises transmitting an identification of the received CCD template to at least one of the management element, the OSS or the third party Preferably, or in some implementations, the CCD template comprises at least one of cluster attribute information, master node attribute information, work node attribute information, network attribute information or image information of the container cluster instance.

Preferably, or in some implementations, the cluster attribute information comprises at least one of a cluster name, a version or resource information.

Preferably, or in some implementations, the master node attribute information comprises at least one of the number of the at least one master node or deployment flavor information of the at least one master node.

Preferably, or in some implementations, the deployment flavor information of the at least one master node comprises at least one of configuration information, deployment information or resource information.

Preferably, or in some implementations, the work node attribute information comprises at least one of the number of the at least one work node or deployment flavor information of the at least one work node.

Preferably, or in some implementations, the deployment flavor information of the at least one work node comprises at least one of configuration information, deployment information or resource information.

Preferably, or in some implementations, the network attribute information comprises at least one of network ports, internet protocol addresses of the at least one master node and the at least one work node, or network information of connections among the at least one master node and the at least one work node.

The present disclosure relates to a method for use in a management element. The method comprises receiving, from a container cluster management, CCM, element, a container cluster instance for use in a life cycle management operation of at least one virtual network function, wherein the container cluster instance is generated based on a container cluster descriptor, CCD, template and comprises at least one master node and at least one work node.

Various embodiments may preferably implement the following features:

Preferably, or in some implementations, the method further comprises transmitting, to the CCM element, a cluster generation request of generating the container cluster instance.

Preferably, or in some implementations, the cluster generation request comprises an identification of the CCD template.

Preferably, or in some implementations, the method further comprises transmitting, to the CCM element, a request for a management of the container cluster instance.

Preferably, or in some implementations, the method further comprises allocating at least one of computing resources, storage resource or network resources for the at least one master node and at least one work node based on the CCD template.

Preferably, or in some implementations the method further comprises transmitting, to the CCM element, a request of CCD template on-boarding, and transmitting, to the CCM element, the CCD template.

Preferably, or in some implementations, the method further comprises receiving, from the CCM element, an identification of the transmitted CCD template.

Preferably, or in some implementations, the CCD template comprises at least one of cluster attribute information, master node attribute information, work node attribute information, network attribute information or image information of the container cluster instance.

Preferably, or in some implementations, the cluster attribute information comprises at least one of a cluster name, a version or resource information.

Preferably, or in some implementations, the master node attribute information comprises at least one of the number of the at least one master node or deployment flavor information of the at least one master node, and the deployment flavor information of the at least one master node comprises at least one of configuration information, deployment information or resource information.

Preferably, or in some implementations, the work node attribute information comprises at least one of the number of the of at least one work node or deployment flavor information of the at least one work node, and Preferably, or in some implementations, the deployment flavor information of the at least one work node comprises at least one of configuration information, deployment information or resource information.

Preferably, or in some implementations, the network attribute information comprises at least one of network ports, internet protocol addresses of the at least one master node and the at least one work node, or network information of connections among the at least one master node and the at least one work node.

The present disclosure relates to a method for use in an operation support system, OSS. The method comprises transmitting, to a container cluster management, CCM, element, a request of a container cluster descriptor, CCD, template on-boarding, and transmitting, to the CCM element, a CCD template.

Various embodiments may preferably implement the following features:

Preferably, or in some implementations, the method further comprises generating the CCD template based on requirement information of a virtual network function.

Preferably, or in some implementations, the method further comprises receiving, from a third party, the CCD template.

Preferably, or in some implementations, the method further comprises receiving, from the CCM element, an identification of the transmitted CCD template.

The present disclosure relates to a method for use in an operation support system, OSS. The method comprises transmitting, to a container cluster management, CCM, element, a cluster generation request of generating a container cluster instance based on a container cluster descriptor, CCD, template.

Various embodiments may preferably implement the following feature:

Preferably, or in some implementations, the cluster generation request comprises an identification of the CCD template.

The present disclosure relates to a method for use in an operation support system, OSS. The method comprises receiving, from a container cluster management, CCM, element, a request for generating a container cluster instance, and transmitting, to the CCM element, an agreement response comprising the CCD template or an identification of the CCD template.

Various embodiments may preferably implement the following feature:

Preferably, or in some implementations, the request for generating the container cluster instance comprises requirement information of at least one virtual network function and the method further comprises:

generating the CCD template based on the requirement information of the at least one virtual network function, or determining the identification of the CCD template based on the requirement information of the at least one virtual network function.

Preferably, or in some implementations, the CCD template comprises at least one of cluster attribute information, master node attribute information, work node attribute information, network attribute information or image information of the container cluster instance.

Preferably, or in some implementations, the cluster attribute information comprises at least one of a cluster name, a version or resource information.

Preferably, or in some implementations, the master node attribute information comprises at least one of the number of the at least one master node or deployment flavor information of the at least one master node.

Preferably, or in some implementations, the deployment flavor information of the at least one master node comprises at least one of configuration information, deployment information or resource information.

Preferably, or in some implementations, the work node attribute information comprises at least one of the number of the at least one work node or deployment flavor information of the at least one work node.

Preferably, or in some implementations, the deployment flavor information of the at least one work node comprises at least one of configuration information, deployment information or resource information.

Preferably, or in some implementations, the network attribute information comprises at least one of network ports, internet protocol addresses of the at least one master node and the at least one work node, or network information of connections among the at least one master node and the at least one work node.

The present disclosure relates to a computing device comprising:

a processor configured to generate a container cluster instance based on a container cluster descriptor, CCD, template, wherein the container cluster instance comprises at least one master node and at least one work node, and a communication unit, configured to transmit, to a management element, the container cluster instance for use in a life cycle management operation of at least one virtual network function.

Various embodiments may preferably implement the following feature:

Preferably, or in some implementations, the processor is configured to perform any aforementioned method.

The present disclosure relates to a computing device comprising a communication unit, configured to receive, from a container cluster management, CCM, element, a container cluster instance for use in a life cycle management operation of at least one virtual network function.

Various embodiments may preferably implement the following feature:

Preferably, or in some implementations, the computing device further comprises a processor configured to perform any one of the aforementioned methods.

The present disclosure relates to a computing device comprising a communication unit, configured to:

transmit, to a container cluster management, CCM, element, a request of a container cluster descriptor, CCD, template on-boarding, and transmit, to the CCM element, a CCD template.

Various embodiments may preferably implement the following feature:

Preferably, or in some implementations, the computing device further comprises a processor configured to perform any one of the aforementioned methods.

The present disclosure relates to a computing device comprising a communication unit, configured to transmit, to a container cluster management, CCM, element, a cluster generation request of generating a container cluster instance based on a container cluster descriptor, CCD, template.

Various embodiments may preferably implement the following feature:

Preferably, or in some implementations, the computing device further comprises a processor configured to perform any one of the aforementioned methods.

The present disclosure relates to a computing device comprising a communication unit, configured to receive, from a container cluster management, CCM, element, a request for generating a container cluster instance, and transmit, to the CCM element, an agreement response comprising the CCD template or an identification of the CCD template.

Various embodiments may preferably implement the following feature:

Preferably, or in some implementations, the computing device further comprises a processor configured to perform any one of aforementioned methods.

The present disclosure relates to a computer program product comprising a computer-readable program medium code stored thereupon, the code, when executed by a processor, causing the processor to implement a method recited in any one of the foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
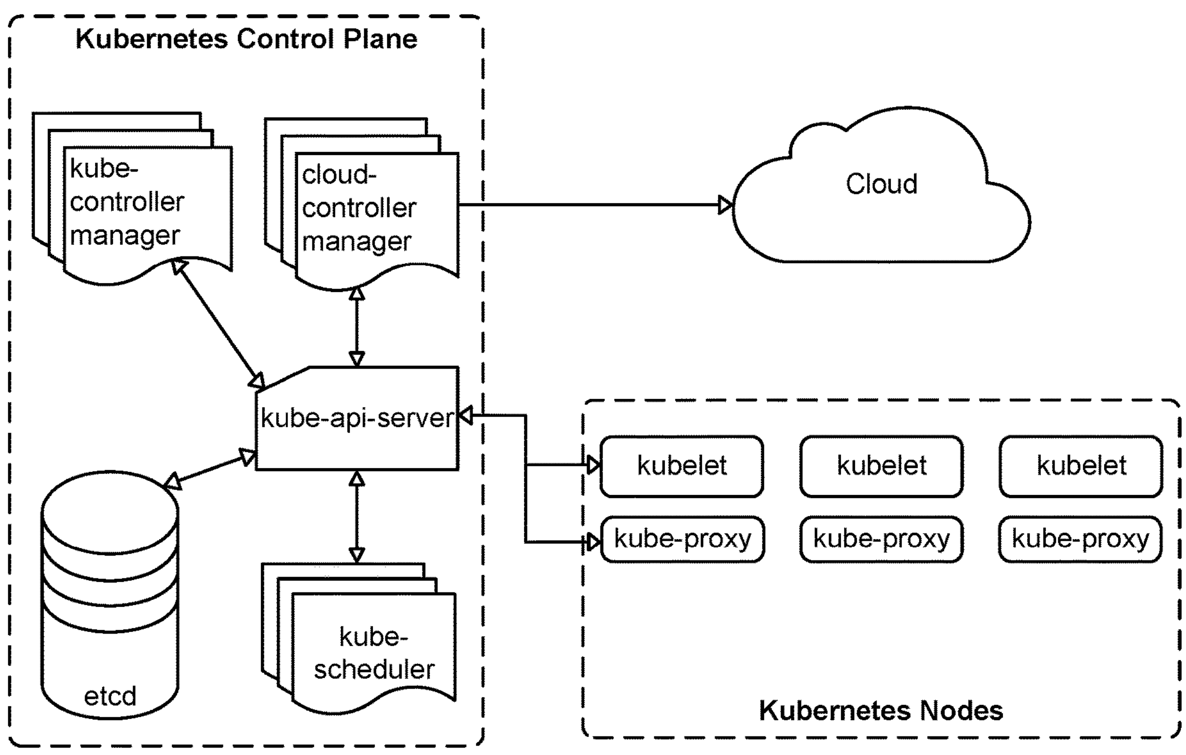
FIG. 1 shows a schematic diagram of a cluster including control plane and work nodes according to an embodiment of the present disclosure.

FIG. 1 shows a schematic diagram of a cluster including control plane and work nodes according to an embodiment of the present disclosure. More specifically, in open-source technology, a Kubernetes® cluster comprises a set of worker machines (which are also called nodes), that run control plane applications (e.g. Kube-schedule, Kube-apiserver, . . . , etc.) and containerized applications. Every cluster has at least one master node and at least one worker node. In the present disclosure, the master node may be equal to a container infrastructure service manager (CISM) and the work node may be equal to a container infrastructure service instance (CISI).

In an embodiment, the components of the control plane running in the master node(s) make global decisions related to the cluster (e.g. scheduling), detect cluster events (e.g. starting up a new point of delivery (PoD)) and respond to cluster events.

In an embodiment, the worker node(s) hosts PoDs that are the components of the application workload. The control plane manages the worker nodes and the PoDs in the cluster.

Figure 2:
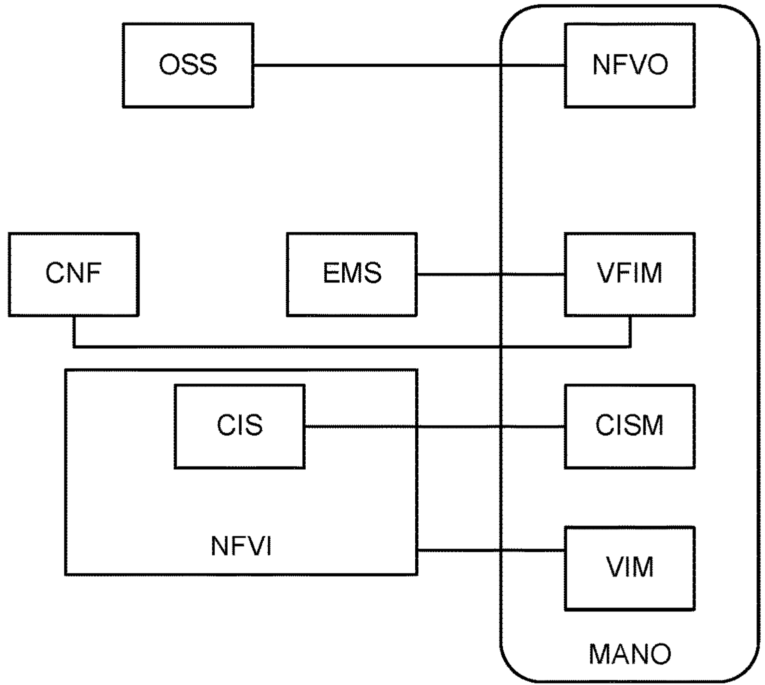
FIG. 2 shows a schematic diagram of an NFV system according to an embodiment of the present disclosure.

FIG. 2 shows a schematic diagram of an NFV system according to an embodiment of the present disclosure. In FIG. 2, the NFV system supports container-based management and orchestration.

More specifically, the functionality of CISM is assigned to new NFV-MANO functional block and the functionality of CISM has two main aspects:

Function A: The management of managed container infrastructure objects (e.g. Kubernetes® PoDs) with a dynamic service resource allocation; and Function B: The management of the virtualized resources exposed by the container runtime environment (i.e., container infrastructure service (CIS)). In an embodiment, function B is not exposed to consumers of the CISM.

In an embodiment, the CISI is used to provide the container infrastructure resources in which the container runtime environment is running within an NFVI virtualization layer.

In an embodiment, the CISM may interact with the CISI to create all managed container infrastructure objects which are the components of the container-based VNF and allocate container resources for them when the container-based VNF are performing life cycle management (LCM) operation (e.g. VNF instantiation).

Figures 3, 4:
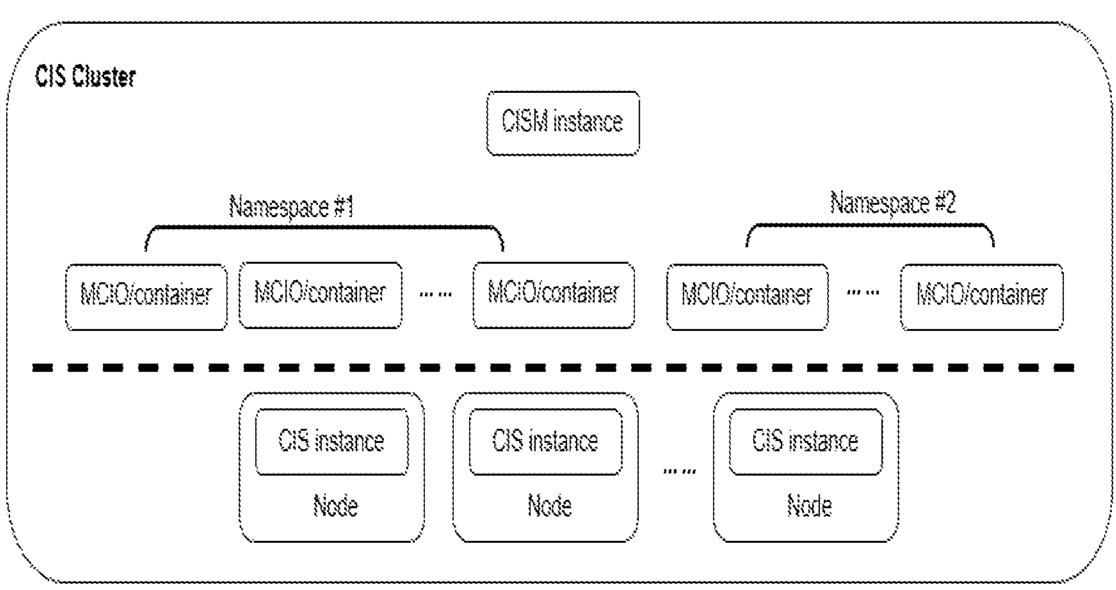
FIG. 3 shows an example of relationships among container infrastructure service (CIS) cluster, CIS manager (CISM), cluster node and CIS instance (CISI) according to an embodiment of the present disclosure.
FIG. 4 shows a schematic diagram of an NFV architecture according to an embodiment of the present disclosure.

FIG. 3 shows an example of relationships among CIS cluster, CISM, cluster node and CISI according to an embodiment of the present disclosure. In FIG. 3, the CIS cluster is composed of one CISM instance and one or more CIS instances. However, it is understood by the skilled person that the present disclosure is not limited to this and also more CISM instances are possible. The CISM instance schedules managed container infrastructure objects (MCIOs) invoked by the VNF to corresponding cluster nodes in the CIS cluster.

In addition, the CIS cluster may be logically divided into one or more namespaces. According to an embodiment, one namespace provides a mechanism to isolate its grouped elements (e.g., MCIOs) from others from a viewpoint of multi-tenancy security and provides access control to the grouped elements. Note that, resources in the cluster nodes of one CIS cluster may be grouped into a namespace and may only belong to that namespace. Those resources are allocated to elements grouped in the namespace.

In an embodiment, the CISM instance provides service interfaces of the namespace management and the cluster node management to its northbound consumers in the scope of the CIS cluster. The CISM instance may also enforce resource limits (i.e., namespace quota) on a namespace as requested by its northbound consumer. Northbound in the present disclosure relates to the ability to communicate with a higher-level component.

In an embodiment, a container cluster manager (CCM) function may be added into the NFV system (architecture) for managing container cluster instance(s). For ease of illustrations, the CCM function is represented by "CCM" hereinafter.

In the present disclosure, the function may be equal to a functional block and/or a network element. In addition, the NFV architecture may be equal to the NFV system.

FIG. 4 relates to a schematic diagram of an NFV architecture according to an embodiment of the present disclosure. In FIG. 4, the CCM is added in the NFV architecture. The CCM is used for life cycle management (operations) of the container cluster instance and the resource management of each node (e.g. the master node and work node) in the container cluster instance. Note that, each container cluster instance comprises at least one master node and at least one work node.

In an embodiment, the CCM provides various service functions and service interfaces, including container cluster descriptor (CCD) template management, performance management, alarm management, log management, fault management and life cycle management. These functions and service interfaces may be invoked by an operation support system (OSS), an NFV-management and orchestration (NFV-MANO) and/or a third party. In an embodiment, the third party may be a service provider or cloud platform service provider. In addition, the CCM may invoke the OSS and NFV-MANO entity related service interfaces to cooperate with the OSS and the MANO for implementing functions of the container cluster management.

In an embodiment, the CCM interacts with the OSS through a service interface produced by CCM. The OSS may invoke this service interface to send the CCD template to the CCM and request the CCM to create a container cluster instance. The CCM creates a container cluster instance based on the CCD template.

In an embodiment, the CCM interacts with a third party through a service interface. The third party may invoke this interface to send the CCD template to the CCM and notify the CCM to create a container cluster instance. The CCM creates a container cluster instance based on the CCD template.

In an embodiment, the CCM interacts with the MANO through a service interface. The OSS can may send the CCD template to a virtualized network function orchestrator (NFVO) in the NFV-MANO. The NFVO may transmit the CCD template to the CCM by invoking the service interface between the CCM and the NFV-MANO and the CCM creates a container cluster instance based on the CCD template.

In an embodiment, the CCM creates a container cluster instance and each of the master node(s) and the work node(s) included in the container cluster instance according to the CCD description (e.g. CCD template), and interacts with the NFV-MANO to allocate resources to each of the master node(s) and work node(s). In an embodiment, the resources comprise at least one of computing resources, storage resources or network resources.

After resources are allocated to each of the master node(s) and work node(s), the CCM may download various types of image files for the master node(s) and work node(s) and may install various required applications and management software (e.g. including Kubernetes® related management function software and network plug-in software). In an embodiment, the CCM may also download the required image files and management software, such as a Kubelet agent and/or a container runtime, from the master node(s) to each of work node(s) in the container cluster instance.

Figures 5, 6:
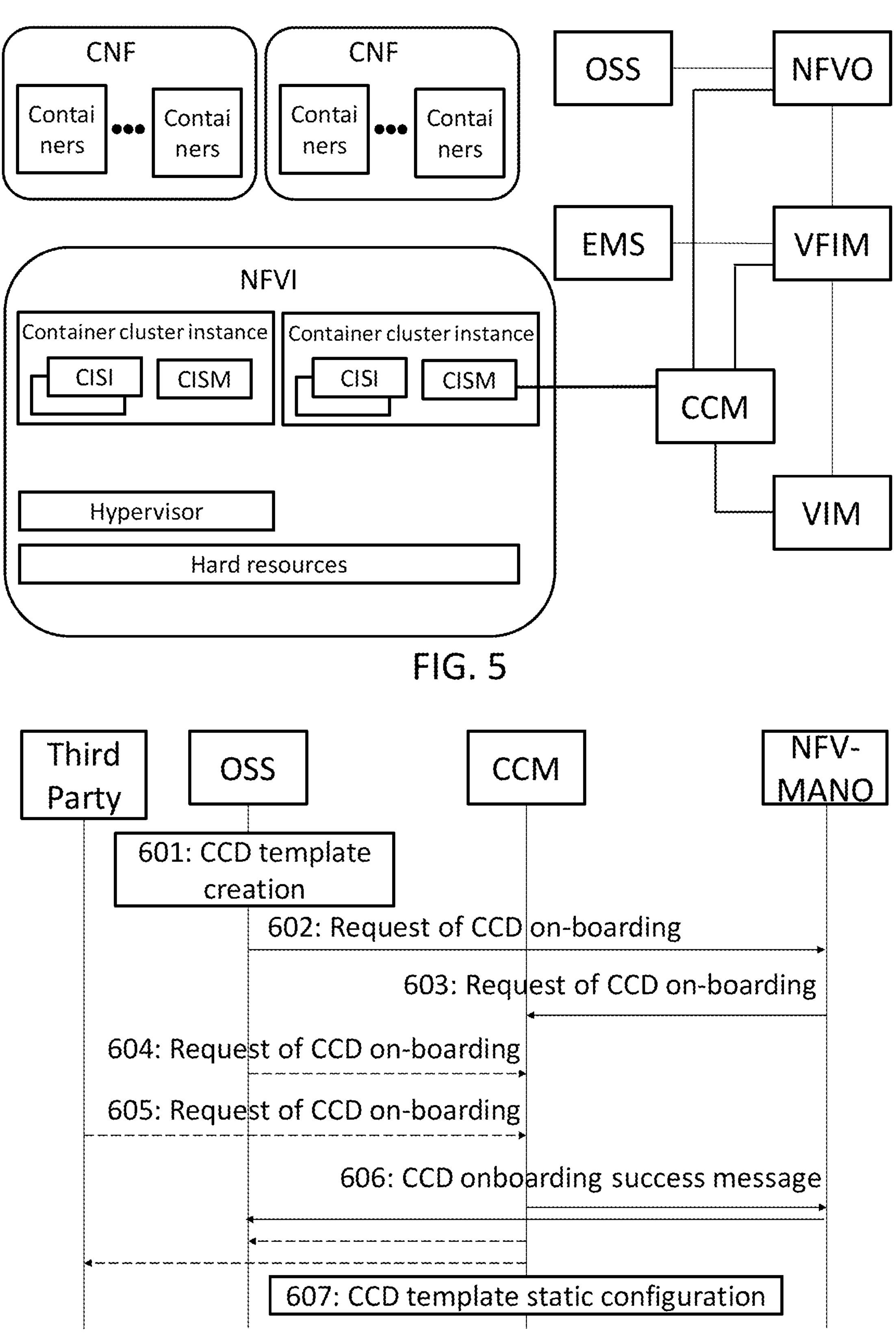
FIG. 5 shows a schematic diagram of a deployment architecture of the CCM, CISM and CISI in the NFV system according to an embodiment of the present disclosure.
FIG. 6 shows a flowchart of a process according to an embodiment of the present disclosure.

FIG. 5 shows a schematic diagram of a deployment architecture of the CCM, CISM and CISI in the NFV system according to an embodiment of the present disclosure. In FIG. 5, the CCM and the NFV-MANO have interfaces to coordinate operations of the cluster lifecycle management and node resource management.

In an embodiment, the CCM is responsible for creating container cluster instances on an NFV infrastructure (NFVI). In an embodiment, the container cluster instance may be created (e.g. generated) on virtual resources such as a virtual machine (VM) or physical resources such as physical server and/or dedicated server.

In an embodiment, after the CCM creates master node(s) and work node(s) in a container cluster instance, the CCM deploys application in nodes, such as Kubernetes® application or control software. For example, the CCM manages the master nodes firstly and installs the applications (e.g. Kubernetes® related applications) for the master nodes. The master node(s) deployed with the application (e.g. Kubernetes® application) may be equal to the CISM (entity) and has the control capability (e.g. Kubernetes® control capability).

In an embodiment, CISM has the capability to manage the CISI(s). The CISM is responsible for deploying applications (e.g. Kubernetes® application such as Kubernetes® agent and network plug-ins) on work nodes. Work nodes deployed with the applications may be equal to a CISI and may be used to create containers.

In the followings, a definition of the CCD template according to an embodiment is introduced.

In an embodiment, the CCD template is used to describe container cluster information descriptor (CISD) and node group information (NGD). Note that, each of the parameters described in the CCD template may be optional or mandatory.

In an embodiment, the CISD may include at least one of cluster name, version, version network information, cluster resource reservation and resource quota information, or cluster drive (e.g. including runtime drive for container running interface (CRI)), network drive for container network interface (CNI) and/or storage drive for container storage interface (CSI)).

In an embodiment, the NGD includes information related to at least one of sub-network, nodes count, service type, image, deployment flavor or multiple networks. In an embodiment, the description information, such as node deployment and resources, is involved in the node deployment flavor information.

According to the information in the CCD template, the CCM deploys the container cluster instance, which may be used to deploy the NS example and/or VNF example of containerization.

According to an embodiment of the present disclosure, the CCD template may include at least one of contents shown in the following table:

TABLE

Embodiment of contents in CCD template

| Attribute name | content | affiliation | specification |
|---|---|---|---|
| Cluster attribute | Cluster name, version, cluster resources | Cluster level | Used to describe the cluster name, version, cluster resources quota/reservation information |
| Cluster Node network | e.g. Neutron network | Cluster level | Used to describe network information e.g. VLAN/VXLAN |
| Cluster drive | Runtime drive Storage drive Network drive | Cluster level | Describes available Network CNI plugin, storage CSI plugin, and container running plugin. |
| Node Sub Network | Sub-network | Node level | Used to describe sub-network information, e.g. the port and IP addresses of a node |
| Node External network | External network | Node level | Used to describe the external network for connections between Node and external elements |
| Master node deployment flavor | Master_fla_id | Node level | Used to describe at least one of configuration, deployment, or resource requirements of the master node(s) |
| Master node count | Master_count | Node level | Used to describe the number of master Nodes deployed |
| Node type | Server_type | Node level | Used to indicate whether a Node type is VM or BM, a virtual machine or a bare-metal machine |
| Image file | Image_id | Node level | The image file for VM or for Bare-metal machine |
| Work node deployment flavor | Work_fla_id | Node level | Used to describe at least one of configuration, deployment, or resource requirements of work node(s) |
| Work node count | Work_count | Node level | Used to describe the number of work Nodes deployed |
| Multiple Networks | Multiple Networks | | Used to describe the networks of management, control, data, signaling for PoDs |

Note that, in the above table, VLAN=virtualized local area network, VXLAN=virtualized extended local area network, BM=bare-metal machine (e.g. physical server or dedicated server).

FIG. 6 shows a flowchart of a process for CCD template on-boarding or configuration according to an embodiment of the present disclosure. In FIG. 6, the CCM provides the CCD management interface. Each entity, such as the OSS, third party, and MANO-related entity (NFVO/VNFM/VIM), invokes the CCD management interface of the CCM to upload the CCD template to the CCM. The process shown in FIG. 6 comprises the following step:

In step 601: CCD On-boarding from the OSS: The CCD template may be orchestrated in the OSS according to the service requirement or imported from the third party to the OSS.

In step 602, the OSS initiates a request of CCD on-boarding to the NFVO of the NFV-MANO. In an embodiment, the request of the CCD on-boarding carrying CCD template. It can be a single CCD template file or multiple CCD template files.

In step 603, the NFVO invokes the CCD management interface of the CCM to upload the CCD template to the CCM and the CCM checks and saves the CCD template.

As an alternative or in addition, the OSS may directly invoke the CCD management interface of the CCM to upload the CCD template to the CCM, and the CCM saves the CCD template file (step 604).

As an alternative or in addition, the operator may upload the CCD to the CCM through the OMC. Note that, the third-party comprises operators and/or third-party service providers. In a network capability opening scenario, a trusted third party may also directly send the CCD template to the CCM, e.g., to request the creation of a cluster (step 605).

In step 606, after the CCD on-boarding successes, the CCM allocates CCD identification (ID) to the CCD template for storage, and returns a success message comprising the allocated CCD ID. Note that, the CCM may transmit the success message comprising the allocated CCD ID to the OSS via the NFV-MANO, and/or directly to the OSS and/or to the third party.

As an alternative or in addition, the CCM may be configured with the required multiple CCD templates through manual static configuration (step 607). In an embodiment, the CCM returns the CCD ID information to the OSS after the CCD templates are uploaded to the CCM through manual static configuration.

In an embodiment, in some application scenarios, the CCD template may not be uploaded to the NFVO through the OSS and may be statically configured by the operator on the MANO entity in accordance with the policy. For example, the NFVO configures the CCD template and notifies the OSS of the CCD information.

As an alternative or in addition, the operator may configure the CCD template on the CCM according to its strategy and the CCM may return the CCD ID information to the OSS.

Figure 7:
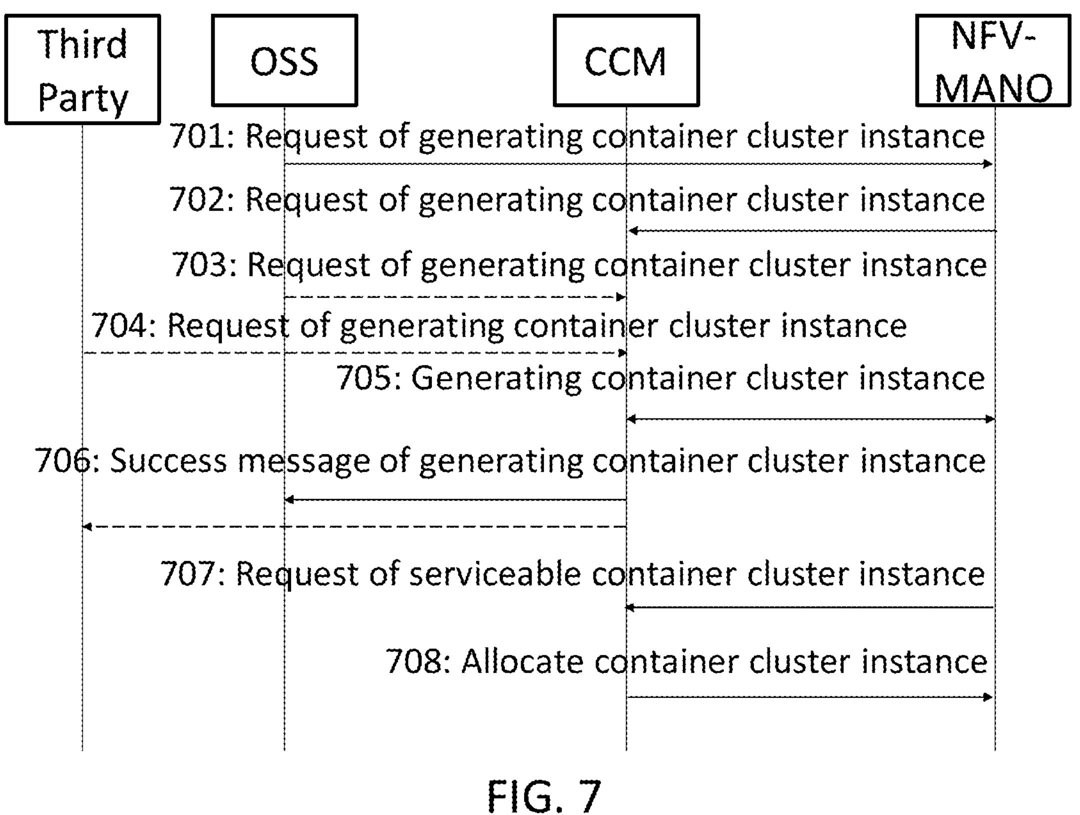
FIG. 7 shows a flowchart of a process according to an embodiment of the present disclosure.

FIG. 7 shows a flowchart of a process of statically generating the container cluster instance according to an embodiment of the present disclosure. In FIG. 7, the OSS and/or the third party requests to create (e.g. generate) the container cluster instance. The CCM creates the container cluster instance, including creating the master node(s) and the work node(s) for the container cluster instance, and configures resources (e.g. the storage resources and network resources) according to the information described in the CCD template.

More specifically, the OSS transmits a request of generating the container cluster instance to NFV-MANO, to create one or more container cluster instances. In an embodiment, the request comprises CCD ID information (e.g. ID of the CCD template used for generating the container cluster instances) (step 701).

In step 702, the MANO entity (e.g. NFVO or VNFM) invokes the service interface provided by the CCM and sends the request of generating the container cluster instance to the CCM, to create one or more container cluster instances. In an embodiment, the request comprises CCD ID information.

As an alternative or in addition, the OSS may directly invoke the service interface provided by the CCM and transmit the request of generating the contain cluster to the CCM (step 703). In an embodiment, the request comprises CCD ID information.

As an alternative or in addition, the third party may directly transmit request of generating the container cluster instance to the CCM (step 704), In an embodiment, the request comprises CCD ID information.

In an embodiment, the third party (e.g. a service provider or cloud platform service provider) sends the request of creating container cluster instance to the CCM according to its own requirements of infrastructure resources.

In step 705, the CCM determines the CCD template according to CCD ID information, generates one or more container cluster instances according to the description of the CCD template, and allocates a container cluster instance ID to the container cluster instance for indicating the container cluster instance.

In an embodiment, a process of generating one container cluster instance comprises the following steps:

1) the CCM invokes the virtual network resource management interface of the VIM according to the description of cluster node network in the CCD template to create virtual network for the container cluster instance.

As an alternative or in addition, the CCM requests the resource quota or resource reservation from the NFVO according to the description of cluster resource quota and resource reservation in the CCD template. After receiving NFVO authorization, the CCM invokes the VIM resource reservation and quota resource management interface to reserve cluster resources and cluster resource quota for the container cluster instance.

2) According to the descriptions of master node and work node in the CCD template, the CCM creates the required quantity of master nodes and work nodes in the container cluster instance.

3) According to the resource description in the node deployment flavor, the CCM invokes the computing resource management interface and storage resource management interface of the VIM to allocate computing resources and storage resources for the master nodes and work nodes in the container cluster instance.

4) According to the description of the node network, the CCM invokes the virtual network resource management interface of the VIM, creates the internal network for node, which can be used for network connection among PoDs in node, and allocates the port and address of the external node and the external network of the node.

5) According to the description in deployment flavor and image description, the CCM configures and deploys master nodes and work nodes. For example, the CCM downloads the images of VM or bare-metal machine, and installs the control software required for deploying the master node(s) and the work node(s).

In step 706, after the container cluster instance is successfully generated, the CCM returns a success message of generating the container cluster instance to the OSS and/or the third party. In an embodiment, the success message comprises container cluster instance ID(s) of the generated container cluster instance(s). As an alternative or in addition, the success message may comprise the quantity and resource information of master nodes and work nodes of the generated container cluster instance(s).

In step 707, when the NFV-MANO performs the operation(s) of containerized NS/VNF life cycle management, the NFVO or VNFM entity of the NFV-MANO transmits a request of a serviceable container cluster instance to the CCM. In an embodiment, this request comprises at least one of an ID of NS, an ID of VNF and/or requested resource information of the serviceable container cluster instance.

In step 708, according to the policy and the situation of current cluster resources, the CCM selects a container cluster instance optimally, and allocates the selected container cluster instance for the containerized NS/VNF LCM operation(s).

In an embodiment, the CCM dynamically generate a container cluster instance according to the CCD template.

Figure 8:
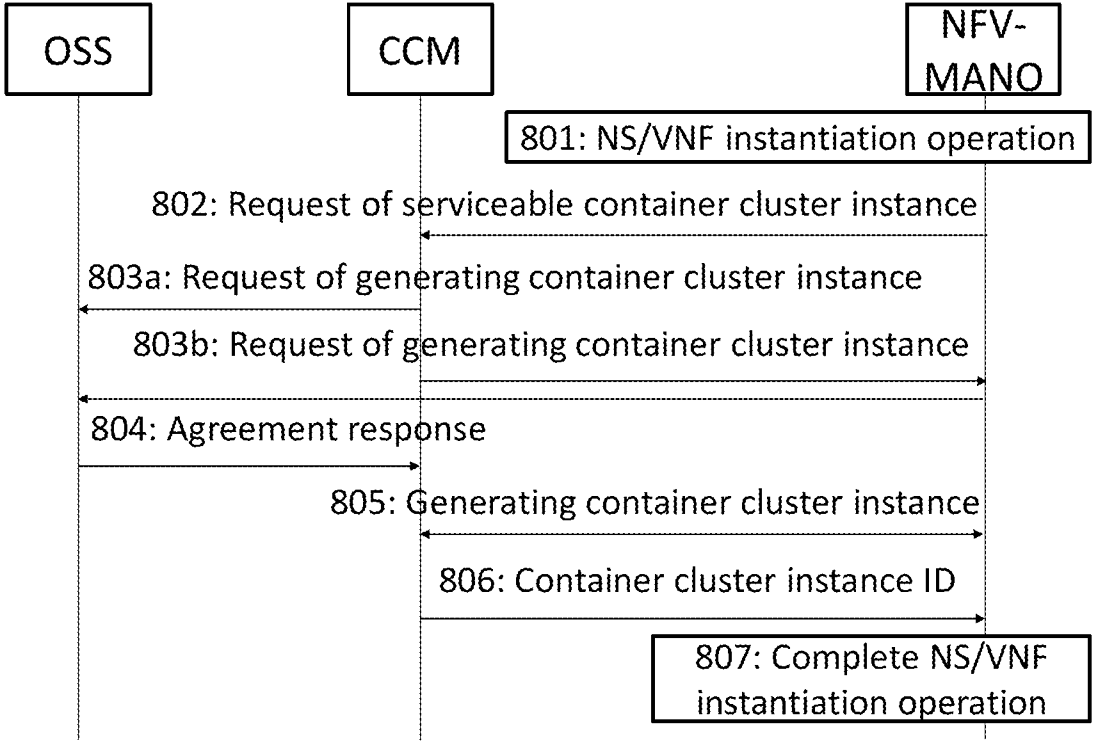
FIG. 8 shows a flowchart of a process according to an embodiment of the present disclosure.

FIG. 8 shows a flowchart of a process according to an embodiment of the present disclosure. In FIG. 8, when the OSS initiates the NS/VNF instantiation operation (i.e. LCM operation) to the NFV-MANO, the NFV-MANO initiates (e.g. transmits) a request of serviceable (e.g. available) container cluster instance(s) to the CCM. In an embodiment, the request of serviceable container cluster instance(s) comprises resource requirement information related to the resources requirements of the serviceable container cluster instance(s). If the CCM finds that there is no available container cluster instance satisfies the resources requirements, the CCM requests the OSS to create a new container cluster instance to serve the NS/VNF instantiation.

More specifically, the OSS initiates the NS/VNF instantiation operation to the NFV-MANO (step 801). In an embodiment, the NFVO of the NFV-MANO is responsible for the NS instantiation operation and the VNFM of the NFV-MANO is responsible for the VNF instantiation operation.

In step 802: the NFVO or the VNFM of the NFV-MANO transmits a request of a serviceable container cluster instance to the CCM for the NS/VNF instantiation according to resource information of the required NS instance or VNF instance. The information of required resources is carried within the request.

When the CCM determines that the container cluster resources in the existing container cluster instances cannot meet the requirements of the NS/VNF instantiation, the CCM transmits a request of generating a new container cluster instance to the OSS. In an embodiment, the CCM transmits the request of generating the new container cluster instance directly to the OSS (step 803*a*). In another embodiment, the CCM transmits the request of generating the new container cluster instance to the OSS via the NFV-MANO (step 803*b*) In an embodiment, the information of the required container cluster resources may be carried in the request of generating the new container cluster instance.

In step 804, the OSS orchestrates a new CCD template or selects an existing CCD template to meet the requirement according to the information of the required container cluster resources comprised in the request of generating the container cluster instance. The OSS transmits the generated CCD template or an ID of the existing CCD template to the CCM.

In step 805, the CCM interacts with the MANO according to the CCD template which is received or indicated by the OSS and generates a new container cluster instance. The specific operations of generating the container cluster instance may be referred to descriptions of step 705.

In step 806, the CCM allocates the newly generated container cluster instance to serve the NS/VNF instance and returns the information of this serviceable container cluster instance to the NFVO or VNFM of the NFV-MANO. In an embodiment, the information of the serviceable container cluster instance includes information related to the master node(s) and work node(s) in the serviceable container cluster instance.

In step 807, the NFVO or VNFM uses the container cluster instance to complete the NS/VNF instantiation operation.

Figures 9, 10:
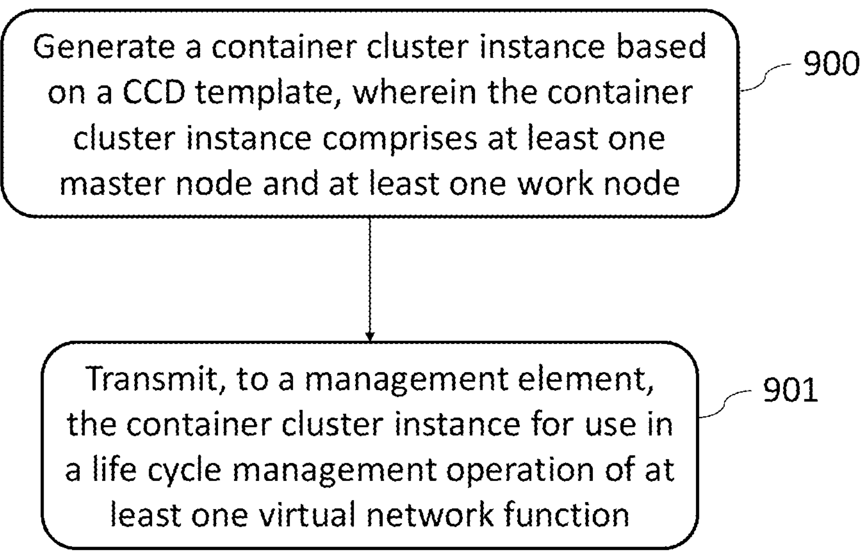
FIG. 9 shows a flowchart of a process according to an embodiment of the present disclosure.
FIG. 10 shows a flowchart of a process according to an embodiment of the present disclosure.

FIG. 9 shows a flowchart of a process according to an embodiment of the present disclosure. The process shown in FIG. 9 may be used in a CCM element (e.g. CCM, a network function, a network element or a network entity) and comprises the following steps:

Step 900: Generate a container cluster instance based on a CCD template, wherein the container cluster instance comprises at least one master node and at least one work node.

Step 901: Transmit, to a management element, the container cluster instance for use in a life cycle management operation of at least one virtual network function.

More specifically, the CCM element generates a container cluster instance based on a CCD template and transmits the container cluster instance for use in a life cycle management operation of at least one virtual network function to a management element (e.g. NFV-MANO, network function (s) or network elements in NFV-MANO). In this embodiment, the container cluster instance comprises at least one master node and at least one work node.

In an embodiment, the CCM element receives a cluster generation request of generating the container cluster instance from at least one of the management element (see, e.g., step 702 or 804), an OSS (see, e.g., steps 701 and 702 or 703) or a third party (see, e.g., step 704).

In an embodiment, the cluster generation request comprises an identification of the CCD template.

In an embodiment, the CCM element receives a request for a management (e.g. lifecycle management or an operation of lifecycle management) of the container cluster instance, e.g., from the management element (see, e.g., step 802).

In an embodiment, the CCM element transmits, to the OSS, a request for generating the container cluster instance and receives, from the OSS, an agreement response comprising the CCD template or an identification of the CCD template. Note that the agreement response may be equal to the cluster generation request of generating the container cluster instance according to an embodiment of the present disclosure.

In an embodiment, for generating the container cluster instance, the CCM element requests for allocating at least one of computing resources, storage resource or network resources for the at least one master node and at least one work node based on the CCD template, deploys, based on the CCD template, the at least one master node as at least one container infrastructure service manager, and deploy, based on the CCD template, the at least one work node as at least one container infrastructure service instance (see, e.g., step 705).

In an embodiment, the CCM element receives a request of CCD template on-boarding from at least one of the management element, an operation support system, OSS, or a third party, and receives the CCD template from at least one of the management element, the OSS or the third party (see, e.g., steps 602 to 604).

In an embodiment, the CCM element transmits an identification of the received CCD template to at least one of the management element, the OSS or the third party (see, e.g., step 605).

In an embodiment, the CCD template comprises at least one of cluster attribute information, master node attribute information, work node attribute information, network attribute information or image information of the container cluster instance.

In an embodiment, the cluster attribute information comprises at least one of a cluster name, a version or resource information.

In an embodiment, the master node attribute information comprises at least one of the number of the at least one master node or deployment flavor information of the at least one master node, and the deployment flavor information of the at least one master node comprises at least one of configuration information, deployment information or resource information.

In an embodiment, the work node attribute information comprises at least one of the number of the at least one work node or deployment flavor information of the at least one work node and the deployment flavor information of the at least one work node comprises at least one of configuration information, deployment information or resource information.

In an embodiment, the network attribute information comprises at least one of network ports, internet protocol addresses of the at least one master node and the at least one work node, or network information of connections among the at least one master node and the at least one work node.

FIG. 10 shows a flowchart of a process according to an embodiment of the present disclosure. The process shown in FIG. 10 may be used in a management element (e.g. NFV-MANO) and comprises the flowing step:

Step 1000: Receive, from a CCM element, a container cluster instance for use in a life cycle management operation of at least one virtual network function.

In this embodiment, for the management element may receive a container cluster instance for use in a life cycle management operation of at least one virtual network function from a CCM element. In an embodiment, the container cluster instance is generated based on CCD template and comprises at least one master node and at least one work node.

In an embodiment, the management element may transmit a cluster generation request of generating the container cluster instance to the CCM element.

In an embodiment, the cluster generation request comprises an identification of the CCD template.

In an embodiment, the management element transmits a request for (a management of) a serviceable container cluster instance to the CCM element. For example, the management may be lifecycle management or an operation of the lifecycle management.

In an embodiment, the management element allocates at least one of computing resources, storage resource or network resources for the at least one master node and at least one work node based on the CCD template, e.g. when being requested by the CCM element.

In an embodiment, the management element transmits a request of CCD template on-boarding and transmits the CCD template to the CCM element.

In an embodiment, the management element receives an identification of the transmitted CCD template from the CCM element.

In an embodiment, the CCD template comprises at least one of cluster attribute information, master node attribute information, work node attribute information, network attribute information or image information of the container cluster instance.

In an embodiment, the cluster attribute information comprises at least one of a cluster name, a version or resource information.

In an embodiment, the master node attribute information comprises at least one of the number of the at least one master node or deployment flavor information of the at least one master node, and the deployment flavor information of the at least one master node comprises at least one of configuration information, deployment information or resource information.

In an embodiment, the work node attribute information comprises at least one of the number of the at least one work node or deployment flavor information of the at least one work node and the deployment flavor information of the at least one work node comprises at least one of configuration information, deployment information or resource information.

In an embodiment, the network attribute information comprises at least one of network ports, internet protocol addresses of the at least one master node and the at least one work node, or network information of connections among the at least one master node and the at least one work node.

Figures 11, 12:
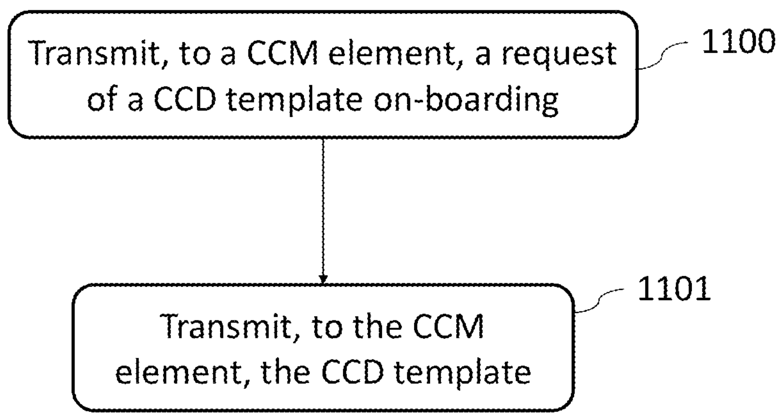
FIG. 11 shows a flowchart of a process according to an embodiment of the present disclosure.
FIG. 12 shows a flowchart of a process according to an embodiment of the present disclosure.

FIG. 11 shows a flowchart of a process according to an embodiment of the present disclosure. The process shown in FIG. 11 may be used in the OSS and comprises the following steps:

Step 1100: Transmit, to a CCM element, a request of a CCD template on-boarding.

Step 1101: Transmit, to the CCM element, a CCD template.

In the process shown in FIG. 11, the OSS transmits a request of a CCD template on-boarding and transmits the CCD template to a CCM element (i.e. CCM).

In an embodiment, the OSS may generate the CCD template based on requirement information of a virtual network function (e.g. network service). As an alternative or in addition, the OSS may receive the CCD template from third party.

In an embodiment, the OSS receives an identification of the transmitted CCD template from the CCM element.

In an embodiment, the CCD template comprises at least one of cluster attribute information, master node attribute information, work node attribute information, network attribute information or image information of the container cluster instance.

In an embodiment, the cluster attribute information comprises at least one of a cluster name, a version or resource information.

In an embodiment, the master node attribute information comprises at least one of the number of the at least one master node or deployment flavor information of the at least one master node In an embodiment, the deployment flavor information of the at least one master node comprises at least one of configuration information, deployment information or resource information.

In an embodiment, the work node attribute information comprises at least one of the number of the at least one work node or deployment flavor information of the at least one work node.

In an embodiment, the deployment flavor information of the at least one work node comprises at least one of configuration information, deployment information or resource information.

In an embodiment, the network attribute information comprises at least one of network ports, internet protocol addresses of the at least one master node and the at least one work node, or network information of connections among the at least one master node and the at least one work node.

FIG. 12 shows a flowchart of a process according to an embodiment of the present disclosure. The process shown in FIG. 12 may be used in the OSS and comprises the following step:

Step 1200: Transmit, to a CCM element, a cluster generation request of generating a container cluster instance based on a CCD template.

In FIG. 12, the OSS transmits a cluster generation request of generating a container cluster instance based on a CCD template to the CCM element.

In an embodiment, the cluster generation request comprises an identification of the CCD template, e.g., if the CCD template exists in (e.g. being saved in or transmitted to) the CCM element.

In an embodiment, the CCD template comprises at least one of cluster attribute information, master node attribute information, work node attribute information, network attribute information or image information of the container cluster instance.

In an embodiment, the cluster attribute information comprises at least one of a cluster name, a version or resource information.

In an embodiment, the master node attribute information comprises at least one of the number of the at least one master node or deployment flavor information of the at least one master node In an embodiment, the deployment flavor information of the at least one master node comprises at least one of configuration information, deployment information or resource information.

In an embodiment, the work node attribute information comprises at least one of the number of the at least one work node or deployment flavor information of the at least one work node.

In an embodiment, the deployment flavor information of the at least one work node comprises at least one of configuration information, deployment information or resource information.

In an embodiment, the network attribute information comprises at least one of network ports, internet protocol addresses of the at least one master node and the at least one work node, or network information of connections among the at least one master node and the at least one work node.

Figure 13:
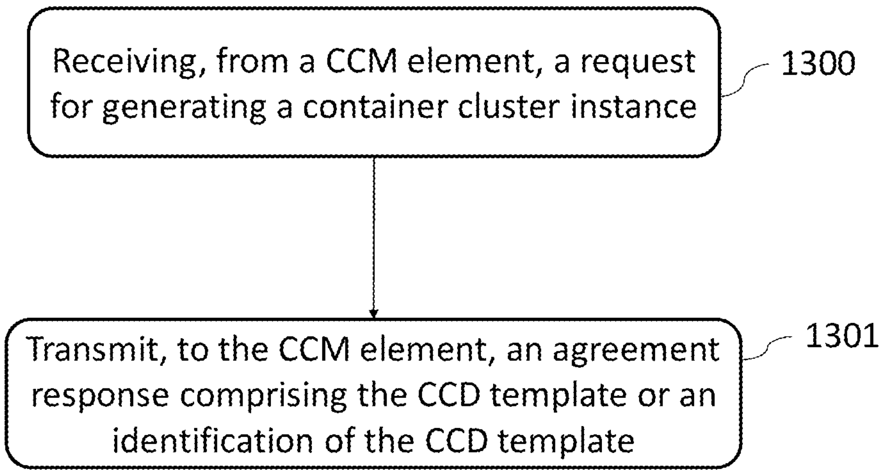
FIG. 13 shows a flowchart of a process according to an embodiment of the present disclosure.

FIG. 13 shows a flowchart of a process according to an embodiment of the present disclosure. The process shown in FIG. 13 may be used in the OSS and comprises the following steps:

Step 1300: Receive, from a CCM element, a request for generating a container cluster instance.

Step 1301: Transmit, to the CCM element, an agreement response comprising the CCD template or an identification of the CCD template.

More specifically, the OSS may receive a request for generating a (new) container cluster instance from the CCM element. Based on the request for generating a (new) container cluster instance, the OSS may transmit an agreement response comprising the CCD template or an identification of the CCD template.

In an embodiment, the request for generating the container cluster instance comprises requirement information of at least one virtual network function. Based on the requirement information, the OSS may generate the CCD template (e.g. when determining there is not existing CCD template satisfied the requirement information) or determines the identification of the CCD template (e.g. when determining an existing CCD template satisfied the requirement information).

In an embodiment, the CCD template comprises at least one of cluster attribute information, master node attribute information, work node attribute information, network attribute information or image information of the container cluster instance.

In an embodiment, the cluster attribute information comprises at least one of a cluster name, a version or resource information.

In an embodiment, the master node attribute information comprises at least one of the number of the at least one master node or deployment flavor information of the at least one master node Preferably, the deployment flavor information of the at least one master node comprises at least one of configuration information, deployment information or resource information.

In an embodiment, the work node attribute information comprises at least one of the number of the at least one work node or deployment flavor information of the at least one work node.

In an embodiment, the deployment flavor information of the at least one work node comprises at least one of configuration information, deployment information or resource information.

In an embodiment, the network attribute information comprises at least one of network ports, internet protocol addresses of the at least one master node and the at least one work node, or network information of connections among the at least one master node and the at least one work node.

Figure 14:
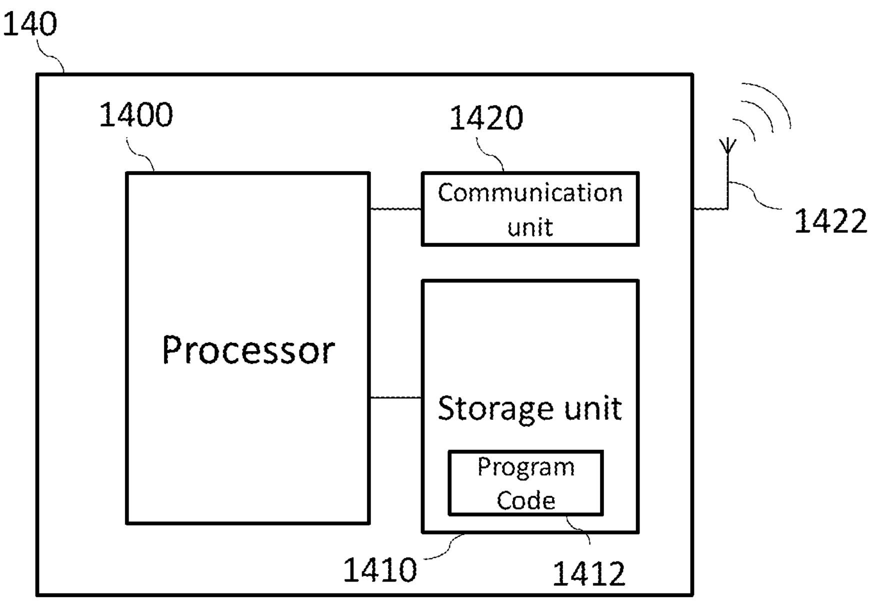
FIG. 14 shows an example of a schematic diagram of a wireless terminal according to an embodiment of the present disclosure.

FIG. 14 relates to a schematic diagram of a computing device 140 according to an embodiment of the present disclosure. The computing device 140 may be used to implement any aforementioned method of the present disclosure. That is, the computing device 140 may operate as at least one of the CCM, the OSS, the NFV-MANO. In FIG. 14, the computing device 140 includes a processor 1400 such as a microprocessor or Application Specific Integrated Circuit (ASIC), a storage unit 1410 and a communication unit 1420. The storage unit 1410 may be any data storage device that stores a program code 1412, which is accessed and executed by the processor 1400. Embodiments of the storage unit 1412 include but are not limited to a subscriber identity module (SIM), read-only memory (ROM), flash memory, random-access memory (RAM), hard-disk, and optical data storage device. The communication unit 1420 may a transceiver and is used to transmit and receive signals (e.g. messages or packets) according to processing results of the processor 1400. In an embodiment, the communication unit 1420 transmits and receives the signals via at least one antenna 1422 shown in FIG. 14.

In an embodiment, the storage unit 1410 and the program code 1412 may be omitted and the processor 1400 may include a storage unit with stored program code.

The processor 1400 may implement any one of the steps in example embodiments on the wireless terminal 140, e.g., by executing the program code 1412.

The communication unit 1420 may be a transceiver. The communication unit 1420 may as an alternative or in addition be combining a transmitting unit and a receiving unit configured to transmit and to receive, respectively, signals to and from another computing device (e.g. the CCM and/or the OSS and/or the NFV-MANO).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for use in a container cluster management element, the method comprising:

generating a container cluster instance based on a container cluster descriptor (CCD) template, wherein the container cluster instance comprises at least one master node and at least one work node, deploying the at least one master node as at least one container infrastructure service manager (CISM) and deploying the at least one work node as at least one container infrastructure service instance (CISI), and transmitting, to a management element, the container cluster instance for use in a life cycle management operation of at least one virtual network function, wherein the CCD template comprises cluster attribute information, and wherein the cluster attribute information comprises at least one of a cluster name, a version or resource information, for efficient management of cluster resources for the life cycle management operation.

2. The method of claim 1, further comprising:

receiving a cluster generation request of generating the container cluster instance from at least one of the management element, an operation support system (OSS) or a third party, wherein the cluster generation request comprises an identification of the CCD template, or receiving a request for a management of the container cluster instance, wherein the request for the management of the container cluster instance is received from the management element, wherein the method further comprises:

transmitting, to the OSS, a request for generating the container cluster instance, and receiving, from the OSS, an agreement response comprising the CCD template or an identification of the CCD template.

3. The method of claim 1, wherein the container cluster instance is generated by:

requesting for allocating at least one of computing resources, storage resource or network resources for the at least one master node and at least one work node based on the CCD template.

4. The method of claim 1, further comprising:

receiving a request of CCD template on-boarding from at least one of the management element, an operation support system (OSS), or a third party, receiving the CCD template from at least one of the management element, the OSS or the third party, and transmitting an identification of the received CCD template to at least one of the management element, the OSS or the third party.

5. The method of claim 1, wherein the CCD template further comprises at least one of master node attribute information, work node attribute information, network attribute information or image information of the container cluster instance, wherein the master node attribute information comprises at least one of the number of the at least one master node or deployment flavor information of the at least one master node, wherein the deployment flavor information of the at least one master node comprises at least one of configuration information, deployment information or resource information, wherein the work node attribute information comprises at least one of the number of the at least one work node or deployment flavor information of the at least one work node, wherein the deployment flavor information of the at least one work node comprises at least one of configuration information, deployment information or resource information, and wherein the network attribute information comprises at least one of network ports, internet protocol addresses of the at least one master node and the at least one work node, or network information of connections among the at least one master node and the at least one work node.

6. A method for use in a management element, the method comprising:

receiving, from a container cluster management (CCM) element, a container cluster instance for use in a life cycle management operation of at least one virtual network function, wherein the container cluster instance is generated based on a container cluster descriptor (CCD) template and comprises at least one master node deployed as at least one container infrastructure service manager (CISM) and at least one work node deployed as at least one container infrastructure service instance (CISI), wherein the CCD template comprises cluster attribute information, and wherein the cluster attribute information comprises at least one of a cluster name, a version or resource information, for efficient management of cluster resources for the life cycle management operation.

7. The method of claim 6, further comprising:

transmitting, to the CCM element, a cluster generation request of generating the container cluster instance, wherein the cluster generation request comprises an identification of the CCD template, wherein the method further comprises:

transmitting, to the CCM element, a request for a management of the container cluster instance.

8. The method of claim 6, further comprising:

allocating at least one of computing resources, storage resource or network resources for the at least one master node and at least one work node based on the CCD template.

9. The method of claim 6, further comprising:

transmitting, to the CCM element, a request of CCD template on-boarding, transmitting, to the CCM element, the CCD template, and receiving, from the CCM element, an identification of the transmitted CCD template.

10. The method of claim 6, wherein the CCD template further comprises at least one of master node attribute information, work node attribute information, network attribute information or image information of the container cluster instance, wherein the master node attribute information comprises at least one of the number of the at least one master node or deployment flavor information of the at least one master node, wherein the deployment flavor information of the at least one master node comprises at least one of configuration information, deployment information or resource information, wherein the work node attribute information comprises at least one of the number of the at least one work node or deployment flavor information of the at least one work node, wherein the deployment flavor information of the at least one work node comprises at least one of configuration information, deployment information or resource information, and wherein the network attribute information comprises at least one of network ports, internet protocol addresses of the at least one master node and the at least one work node, or network information of connections among the at least one master node and the at least one work node.

* * * * *